March 5, 1963  TADEUSZ MALINOWSKI  3,079,833
RANGEFINDER AND GUNSIGHT COMBINATION WITH COUPLED
RETICLE ADJUSTING MEANS FOR
BALLISTIC CURVE CHANGES
Filed Oct. 13, 1958  3 Sheets-Sheet 1

Inventor
T. MALINOWSKI
By Fetherstonhaugh & Co.
Attorneys

Inventor
T. MALINOWSKI
By Fetherstonhaugh & Co.
Attorneys

March 5, 1963  TADEUSZ MALINOWSKI  3,079,833
RANGEFINDER AND GUNSIGHT COMBINATION WITH COUPLED
RETICLE ADJUSTING MEANS FOR
BALLISTIC CURVE CHANGES Filed Oct. 13, 1958  3 Sheets-Sheet 3

Inventor
T. MALINOWSKI

By Fetherstonhaugh & Co.
Attorneys

United States Patent Office 3,079,833
Patented Mar. 5, 1963

3,079,833
RANGEFINDER AND GUNSIGHT COMBINATION WITH COUPLED RETICLE ADJUSTING MEANS FOR BALLISTIC CURVE CHANGES
Tadeusz Malinowski, 92 Hanley St., Midland, Ontario, Canada
Filed Oct. 13, 1958, Ser. No. 766,924
2 Claims. (Cl. 88—2.7)

This invention relates to improvements in optical aiming instruments known as rangefinder-sights.

The present application is a continuation-in-part of my co-pending application Serial No. 578,385, filed April 16, 1956, now abandoned.

The common feature of all these instruments is that they combine two distinct functions: one is range-finding, i.e. the determining of the distance to the target; the other is sighting, i.e., providing for a suitable tangent elevation angle of the barrel of the weapon to which the instrument is clamped.

In rangefinder-sights to which this invention applies, the range is determined by an adjustable optical system which operates on the total-coincidence or split-image principle and the required tangent elevations are provided by an aiming heircross which is moved vertically across the field of vision. The movements of the adjustable optical system and of the heircross are correlated by means of a suitable mechanical link (i.e. by a cam-driven lever).

The tangent elevation angle thus provided by the sighting system of the instrument for a given setting of the range-finding system of said instrument is determined uniquely by design of the instrument. The plot of these tangent elevation angles versus range is therefore known in the trade as "the ballistic curve of the instrument."

On the other hand, for a given firing weapon, the tangent elevation angle of the barrel required to score a hit on a target at a given range is uniquely determined by the prevailing firing conditions such as the kind of ammunition used, the muzzle velocity imparted to the projectile by the propellant, the air density and velocity, difference in levels of the target relative to the weapon, etc. The plot of these tangent elevation angles versus range is therefore known in the trade as "the ballistic curve of the weapon."

Rangefinder-sights are so designed that—over the operational range of the weapon—the ballastic curve of the instrument is practically identical with the ballistic curve of the weapon for a set of prescribed firing conditions.

In practice the ballistic curve of the weapon might depart in a determined and predictable manner from that which was taken as a basis for designing the instrument. This occurs if one or more of the actual firing conditions depart from those laid down for designing the instrument.

If this happens the instrument no longer functions properly until its operation is modified by some adjusting device so as to change the ballistic curve of the instrument and make it fit the new ballistic curve of the weapon determined by the now prevailing set of firing conditions.

There are several known rangefinder-sights which provide means of compensating for changes in the ballistic curve of the associated weapon. Some of them incorporate a facility which makes it possible to modify the ballistic curve of the instrument so that the latter provides the exact tangent elevation angle required for new firing conditions at one arbitrarily selected range. At other ranges the so modified ballistic curve of the instrument approximates the new ballistic curve of the weapon with sufficient accuracy for practical purposes.

We have found a new way to achieve this effect.

In rangefinder-sights in which the optical deflecting device consists of a pair of wedges placed in the path of one of the two beams of light of the rangefinding system of the instrument so that they can be rotated in opposite directions by equal angles, our method consists in shifting the position of the haircross-driving cam with respect to the wedges.

In rangefinder-sights in which the optical deflecting device is in the form of a flat hinged or pivoted refracting plate located in one of the two beams of light of the rangefinding system of the instrument between the objective lens and its focal point and coupled with the haircross-driving mechanism, our method consists in suitably changing the position of the plate on its hinge or pivot with respect to said coupling mechanism.

In a rangefinder-sight in which the optical deflecting device is in the form of a wedge mounted in one of the two beams of light of the rangefinding system of the instrument between the objective lens and its focal point so that it can be shifted along the optical axis of said lens and is connected to the haircross elevating mechanism by means of a cam, our method consists in displacing the cam with respect to the wedge in a direction parallel to the axis of the objective lens.

In the accompanying drawings which illustrate the principle of the invention and its embodiments:

The fundamental idea on which the present idea is based can be explained with reference to FIG. 1 which, in its upper part, shows the line-of-flight, or trajectory of the projectile between a firing weapon O and a target T located at a range R. This trajectory is characterized by the tangent elevation angle $e$ of the barrel required to score a hit and by the angle of arrival $a$ of the projectile at the target. This trajectory applies for a given initial set of firing conditions.

The relevant ballistic curve of the weapon for said initial set of firing conditions is obtained by determining the tangent elevation angle $e$ for each value of the range $R$ and by plotting $e$ against $R$ in Cartesian coordinates.

Figure 1:
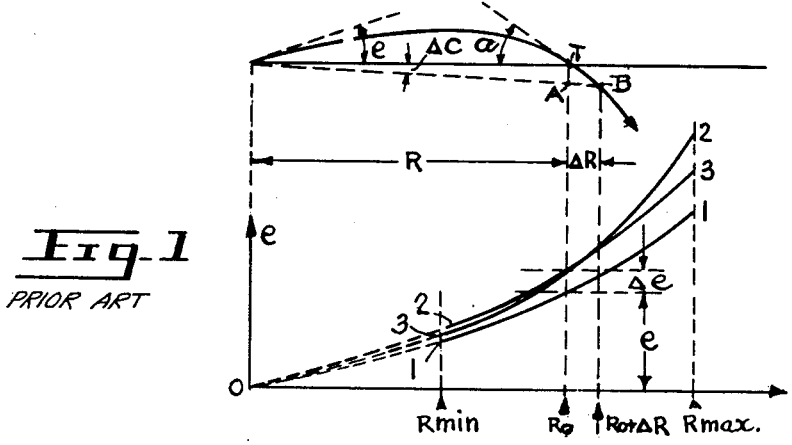
FIG. 1 is a diagram showing: in its upper part, the trajectory of a projectile between the firing weapon and the target and, in its lower part, the corresponding ballistic curve.

The curve designated 1, shown in the lower part of FIG. 1, is thus obtained. The portion of this curve between the minimum and maximum useful ranges of the weapon $R_{min}$ and $R_{max}$, is of practical significance.

If the set of initial firing conditions to which this ballistic curve pertains is taken as reference to design the rangefinder-sight associated with the weapon, then curve 1 is also the ballistic curve of the rangefinder-sight.

Now if one or more of the firing conditions change, the ballistic curve of the weapon also changes in a manner depending upon the change of firing conditions. For instance the new ballistic curve of the weapon might follow the line designated 2, while curve 1 remains the ballistic curve of the instrument. The performance of the instrument now becomes faulty and the error in the tangent elevation angle provided by the sighting system of the instrument for any range is the difference between the corresponding ordinates of curves 1 and 2. This error will be designated by the symbol $\Delta e$.

It is readily seen from FIG. 1 that at any arbitrarily chosen reference range $R_0$ it is possible to provide for a tangent elevation angle $e + \Delta e$ required by the new ballistics by so affecting the instrument that it will effectively read a range $R_0 + \Delta R$ while the actual range to the target is $R_0$. It is also seen from FIG. 1 that the relation between the increment $\Delta e$ of the tangent elevation angle, required to nullify the elevation error at any particular range R, and the corresponding range increment $\Delta R$ is given by the formula:

$$\Delta e = a \cdot \frac{\Delta R}{R} \qquad (1)$$

This formula is sufficiently accurate for flat trajectories, i.e. for small values of the angle of arrival $a$, encountered in most practical cases.

The possible affecting of the instrument in the above manner will also change the elevation angles of the barrel of the associated weapon for targets at ranges other than the reference range $R_0$, so that the ballistic curve of the instrument will change in a way depending on the manner in which the instrument was affected and will now follow some new line, e.g. the line designated 3 on FIG. 1 which must intersect the ballistic curve of the weapon at the reference range $R_0$ but will not necessarily coincide at other ranges with the new ballistic curve 2 of the weapon. Therefore some residual errors of the tangent elevation angle might remain at ranges other than the arbitrarily selected reference range $R_0$ and the described method of catering for changes in the ballistic curve of the weapon is—generally speaking—only approximate.

Figure 2:
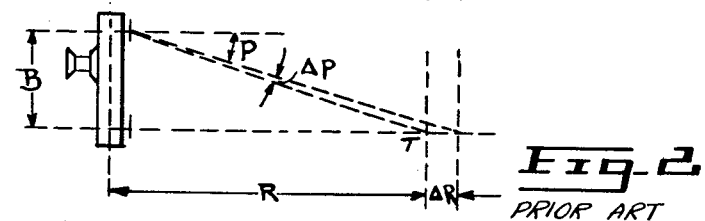
FIG. 2 is a diagrammatic plan view of a rangefinder trained on a target.

Now, with reference to FIG. 2, the range R to a target T is determined in an optical rangefinder by training it at the target and measuring the angle $p$ subtended by the base B of the instrument when viewed from the target. Therefore, in order to make the instrument virtually read the range $R + \Delta R$ instead of R one must effect it in such a manner as to make it virtually indicate for a range R a parallax angle $p + \Delta p$ instead of $p$. The magnitude of this increment must be adjustable so as to provide the required increment $\Delta e$ of the tangent elevation angle.

The relation between any range R and the corresponding parallax angle $p$ is given by the formula $$p = \frac{k \cdot B}{R} \qquad (2)$$

which is sufficiently accurate for practical purposes for small values of $p$ as encountered in practice and in which $k$ is a constant conversion coefficient dependent upon the units used: e.g. $k = 25.4$ (millimetres per inch) if B is in inches, R in metres and $p$ in angular mils. The relation between the range increment $\Delta R$ and the corresponding parallax angle increment $\Delta p$ can be now found by differentiating Formula 2 and combining it with Formula 1. The result is:

$$\Delta e = -a \cdot \frac{R}{kB} \cdot \Delta p \text{ or } \Delta e = -a \cdot \frac{\Delta p}{p} \qquad (3)$$

The ground hitherto covered is known to prior art and various means of affecting the instrument so as to produce the required increment $\Delta p$ of the parallax angle $p$ have been proposed. What we claim is a novel improvement of existing rangefinder-sights directed at producing said parallax increment $\Delta p$. This improvement will be described hereafter.

In order to assess the merits and limitations of our invention and to take full advantage of same, it is essential to know exactly how the novel improvements make it possible to modify the ballistic curve of the instrument. Consequently relevant formulae for computing tangent elevation angle increments $\Delta e$ obtainable according to this invention will be derived alongside the description of various embodiments of the invention.

Figure 3:
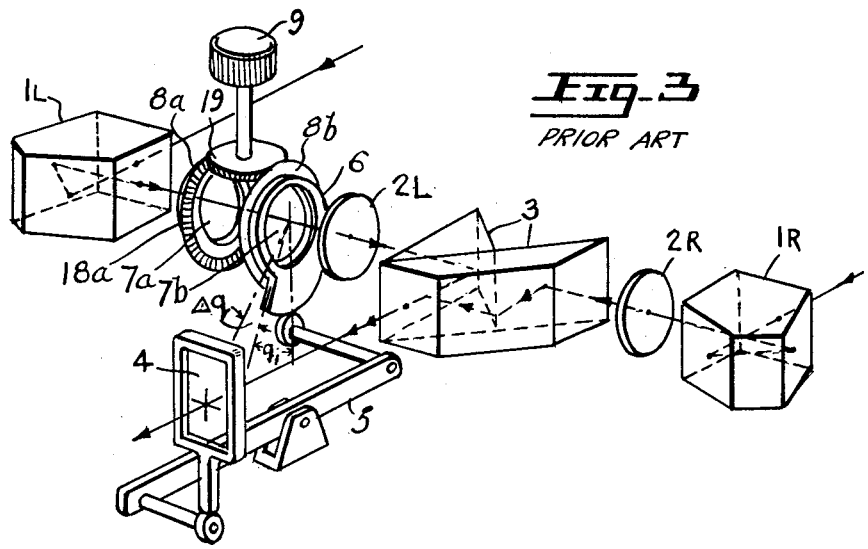
FIG. 3 is a diagrammatic perspective view of a rangefinder-sight with an optical deviator in the form of a pair of counter-rotating wedges to which the improvement according to the present invention can be applied.

With reference to FIG. 3 which shows one rangefinder-sight known to prior art to which our invention can be applied, 1L and 1R are the left and right-hand side pentagonal prisms whose spacing is the base of the instrument B. They intercept beams of light emanating from the target and, upon reflection, direct them via objective lenses 2L and 2R towards the centre of the instrument as indicated by arrows where a pair of cemented conventional combining prisms 3 is located. The two beams are combined on the semi-transparent and semi-reflecting interface of the prisms pair 3 and are directed to the eye of the observer via a reticle 4 on which an aiming haircross is engraved so that two overlapping images of the target are presented to the operator. The roof prisms and the eyepiece are omitted from FIG. 3 for the sake of clarity; they are placed along the path of the combined rays between prisms 3 and the eye of the observer. The reticle 4 is mounted between a pair of verticle guides (not shown) so that it can slide up or down under the action of a fulcrumed lever 5 driven by a rotatable cam 6 whose shape determines the ballistic curve of the instrument.

In the rangefinder-sight considered, the optical deviator consists of a pair of identical wedges 7a and 7b placed in the path of one of the beams of the rangefinder. The wedges are mounted in rotatable frames 8a and 8b respectively and coupled to a common rangefinder control knob 9 so that they rotate in opposite directions by equal angles when the knob is turned. The design of this coupling mechanism does not affect our invention; in the example portrayed in FIG. 3 it takes a form of conical gears 18a and 18b cut on the edges of the frames 8a and 8b and meshed to a pinion 19 fixed to the shaft of the knob 9. If the angle of deflection of each wedge is $d$, the angular deflection $p$ of the beam produced by the rotation of the wedges over an angle $q_1$ from their neutral position is:

$$p = 2d \cdot \sin q_1 \qquad (4)$$

Rangefinding is done by rotating the knob 9 after training the instrument on the target. This causes the image of the target formed by the beam of pentaprism 1L to drift laterally until it merges with the image formed by the luminous beam of the other pentaprism 1R. The merging of images indicates the correct setting of the instrument for the range of the target. In instruments known to prior art the cam 6 is rigidly conected with the frame 8b so that it rotates with it and shifts the reticle 4 so as to provide a given tangent elevation angle of the barrel of the weapon to which the instrument is clamped. This tangent elevation angle follows the ballistic curve of the instrument which is identical with the ballistic curve of the weapon for the initial set of firing conditions, as shown by line 1 on FIG. 1.

According to our invention the angular position of the cam 6 with respect to the frame 8b is made adjustable rather than being fixed so that the cam can be rotated by an angle $\Delta q_1$, without altering the position of the frame 8b. If this is done, the elevation of the reticle 4 is changed and therefore the tangent elevation angle $e$ is altered by an increment $\Delta e$ to a new value $e+\Delta e$ without disturbing the position of the beam deflecting wedges 7a, 7b which determines the range R at which image coincidence occurs. If after this shift over and angle $\Delta q_1$, the cam 6 is allowed to rotate together with frame 8b, the tangent elevation angle will follow a new ballistic curve of the instrument such as shown by line 2 on FIG. 1.

The difference $\Delta e_1$ in the tangent elevation of the original and the modified ballistic curve of the instrument depends upon the amount of angular shift $\Delta q_1$ of the cam and can be determined by differentiating Formula 4 and combining it with Formula 3. The result becomes:

$$\Delta e_1 = -a \cdot (\sqrt{N^2 R^2 - 1}) \cdot \Delta q_1 \qquad (5a)$$

where N is a constant quantity determined by the design parameters of the instrument and given by:

$$N = \frac{2d}{kB} \qquad (5b)$$

None of the rangefinder-sights which incorporate facilities for adjustment of the ballistic curve known to prior art provides a tangent elevation increment which follows the law defined by Formula 5a.

Figure 4:
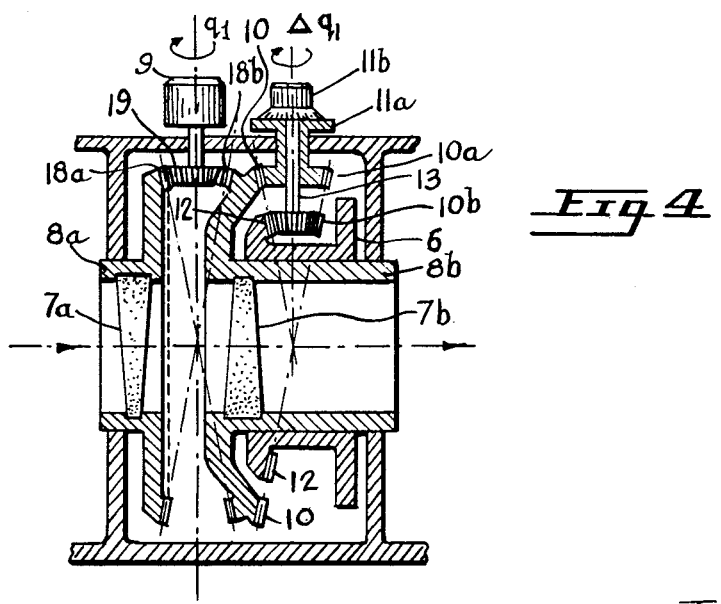
FIG. 4 shows by way of example a vertical cross-section through one of a number of conventional mechanisms which can be used in order to apply the refinement according to the present invention to the rangefinder-sight of FIG. 3.

There are many ways of fixing adjustably a cam 6 on a frame 8b. One possible way of incorporating the refinement according to this invention in the rangefinder-sight of FIG. 3 is illustrated on FIG. 4, by way of example.

It is seen that a second gear 10 is now cut along the rim of the rotatable frame 8b in addition to the gear 18b meshing with the pinion 19 of the ranging knob 9. This new gear 10 meshes with a pinion 10a mounted on a hollow shaft protruding through the casing of the instrument and capped by a disk 11a so that the disk rotates when the ranging knob 9 is operated.

The cam 6 is now rotatably mounted on the frame 8b and features a collar with a conical gear 12 cut along its rim. The gear 12 meshes with a pinion 10b which is mounted on a shaft 13 rotatably extended through the hollow shaft of pinion 10a and capped by a knob 11b. The gear ratio between items 8a and 10a is identical to that between items 6 and 10b so that the cam 6 rotates together with frame 8b; likewise the disk 11a and the knob 11b rotate together.

This is caused by the friction between items 6 and 8b and between the shafts and caps of the pinions 10a and 10b, said friction being assisted by a conventional device such as a spring or a spring-washer not shown on the drawing. The angular displacement $\Delta q_1$ of the cam 6 relative to frame 8b required to modify the ballistic cure of the instrument is now achieved by rotating the adjustment knob 11b while holding the ranging knob 9 still. The magnitude of the displacement $\Delta q_1$ can be read off a scale engraved on the skirt of knob 11b which now drifts past a pointer on the disk 11a.

Figure 5:
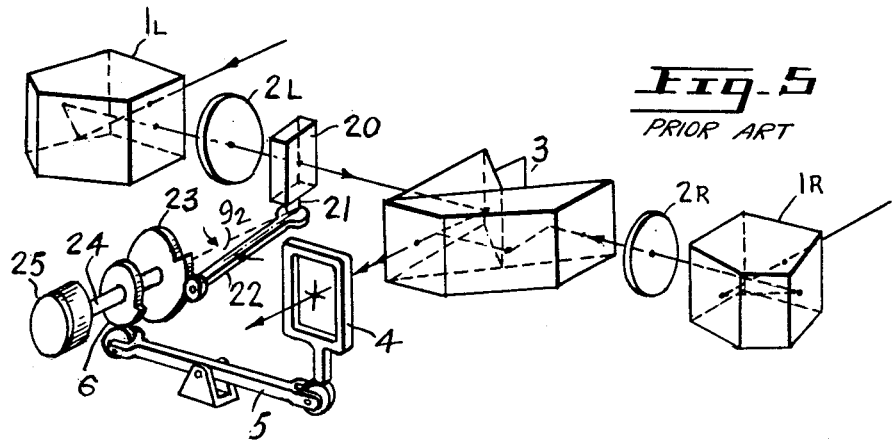
FIG. 5 is a diagrammatic perspective view of a rangefinder-sight with an optical deviator in the form of a pivoted plane-parallel plate with the improvement according to the present invention.

Reference is now made to FIG. 5 which shows another type of a rangefinder-sight known to prior art to which our invention can be applied. Items 1L, 1R, 2L, 2R, 3, 4, 5 and 6 are similar to components designated by the same numerals in the instrument shown on FIG. 3 already described and they perform identical functions.

Figure 6:
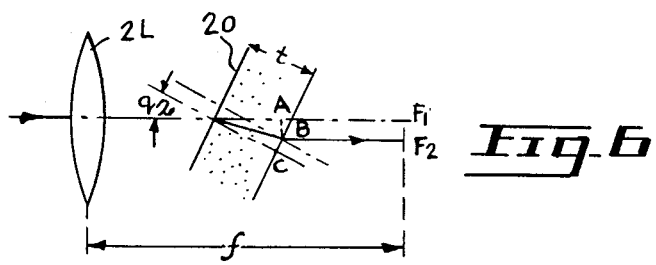
FIG. 6 is a diagrammatic picture of a part of the optical system of the instrument of FIG. 5 showing the principle of operation of its deviator.

In this instrument the deviator is in the form of an optical plane parallel plate 20 so mounted that it can be pivoted over a vertical axis. The rotation of the plate by an angle $q_2$ results in an angular deflection of the beam by an angle $p$ whose magnitude can be easily derived from FIG. 6 which is a diagrammatic plan view of the relevant part of the instrument shown in FIG. 5.

It is readily seen that the rotation of the plate over an angle $q_2$ from its neutral position results in a shift of the focal point of the objective lens 2L from $F_1$ to $F_2$ where $$F_1 F_2 = \frac{n-1}{n} \cdot t \cdot \sin q_2$$

In this formula $t$ is the thickness of plate 20 and $n$ its refractive index. If the focal lengths of the objective 2L is $f$ then:

$$p = \frac{F_1 F_2}{f} = \frac{n-1}{n} \cdot \frac{t}{f} \cdot \sin q_2 \qquad (6)$$

The design of the conventional mechanism pivoting the plate 20 does not affect the present invention. In the instrument portrayed on FIG. 5 this mechanism consists of a vertical shaft 21 on which the plate is rigidly mounted, of a horizontal finger 22 fixed on said shaft and deflected laterally by a rotatable cam 23 mounted on another shaft 24 protruding from the body of the instrument and capped by a manually operable knob 25.

The rangefinding routine is identical with that of the instrument already described above with reference to FIG. 3. In instruments known to prior art the cam 6 is rigidly fixed on the shaft 24 so that it rotates together with cam 23 when the rangefinding routine is carried out. It shifts the reticle 4 vertically to provide the tangent elevation angle of the associated weapon as required for any given range by the initial set of firing conditions.

According to our invention the cam 6 is so mounted that it can be angularly rotated with respect to the ranging knob 25 and cam 23 rather than being rigidly connected to cam 23. By displacing cam 6 relative to cam 23 the elevation of the reticle 4 is changed and the tangent elevation angle $e$ is thereby altered by an increment $\Delta e_2$ as if the deflecting plate 20 were rotated by an angle $\Delta q_2$ although the actual position of the plate remains the same and thereby the ballistic curve of the instrument can be changed to fit a new set of firing conditions.

The relation between the angular increment $\Delta q_2$ and the resultant change $\Delta e_2$ of the ballistic curve of the instrument can be found by differentiating Formula 6 and combining it with Formula 3. The result becomes:

$$\Delta e_2 = -a \cdot (\sqrt{N_2^2 \cdot R^2 - 1}) \cdot \Delta q_2 \qquad (7a)$$

where $N_2$ is a constant determined by the design parameters of the instrument and is given by the formula $$N_2 = \frac{n-1}{n} \cdot \frac{t}{f} \cdot \frac{1}{kB} \qquad (7b)$$

It is seen that in this case the working of the adjustment facility is identical to that proposed with respect to the previous instrument and defined by Formula 5a.

Figure 7:
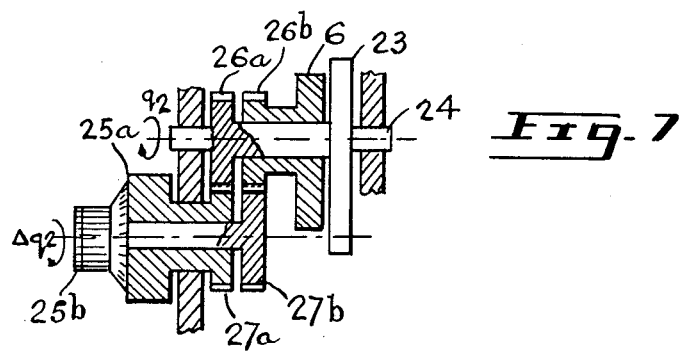
FIG. 7 shows by way of example a vertical cross-section through one of a number of conventional mechanisms which can be used in order to apply the present invention to the rangefinder-sight of FIG. 5.

There are many known ways of fixing a cam 6 on a shaft 24 in an adjustable manner and the way in which it is done has no bearing on the invention. One possible design is shown in FIG. 7. Now the shaft 24 on which the cam 23 is rigidly mounted features a cog 26a with cylindrical gears which mesh with a pinion 27a mounted on a hollow shaft. The latter protrudes from the case of the instrument and is capped by the ranging knob 25a. The cam 6 is now fixed to a hollow shaft rotatably mounted on shaft 24 and features a cylindrical cog 26b which is identical with cog 26a and meshes with pinion 27b. The latter is identical with pinion 27a and is mounted on a shaft threaded through the shaft of pinion 27a and capped by an adjustment knob 25b.

Consequently, due to friction between mating parts, the cams 6 and 23 and the knobs 25a and 25b move together when the ranging knob 25a is rotated. The friction is increased by conventional means such as springs or spring-washers. The angular displacement of cam 6 with respect to cam 23 required to modify the ballistic curve of the instrument is achieved by rotating knob 25b while holding knob 25a still. The magnitude of the displacement $\Delta q_2$ can be read off a scale engraved for the purpose on the skirt of knob 25b which now drifts past a pointer on the face of knob 25a.

Figure 8:
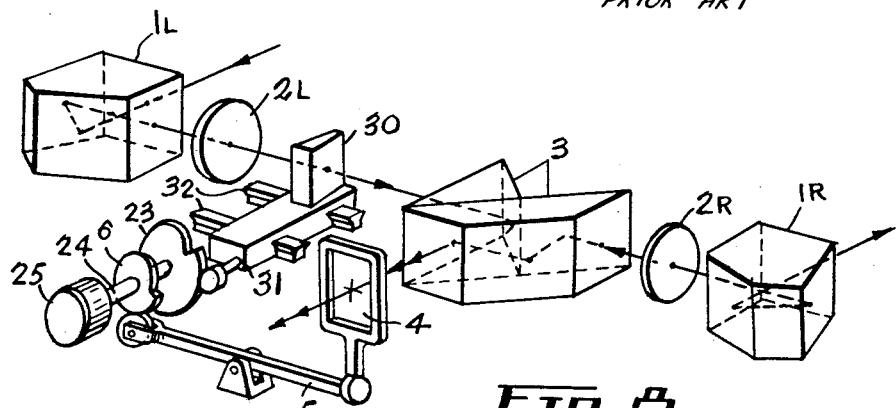
FIG. 8 is a diagrammatic perspective view of a rangefinder-sight with an optical deflector in the form of a linearly slidable wedge.

Reference is now made to FIG. 8 which shows yet another rangefinder-sight known to prior art to which this invention can be applied. Items designed 1L, 1R, 2L, 2R, 3, 4, 5 and 6 are similar to items correspondingly designed on FIGS. 3 and 5 and perform identical functions. This instrument differs from those previously described only in the layout of its optical deviator which now takes the form of a wedge 30 placed on the path of the beam of the pentaprism 1L between the objective lens 2L and its focus so that it can be shifted along the axis of the objective lens.

Figure 9:
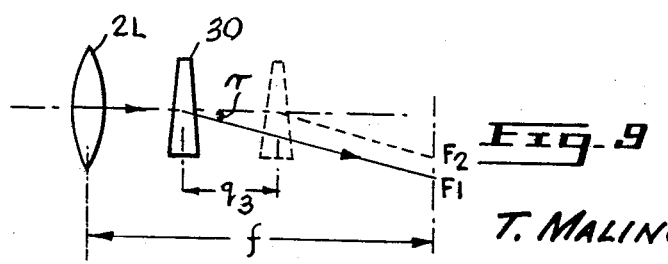
FIG. 9 is a diagram of a part of the optical system of the instrument of FIG. 8 showing the principle of operation of its deviator.

The working of this deviator can be explained with reference to FIG. 9 on which $r$ indicates the deflecting angle of the wedge. It is readily seen that a shift of the wedge 30 over a distance $q_3$ results in a lateral displacement of the focus of the objective from $F_1F_2$ where $$F_1F_2 = r \cdot q_3$$

If the focal distance of the objective is $f$, then the resultant angular deviation of the beam is:

$$p = \frac{F_1F_2}{f} = \frac{r}{f} \cdot q_3 \qquad (8)$$

The design of the conventional mechanism for shifting longitudinally the wedge 30 and for coupling its movement with the vertical displacement of the reticle 4 is immaterial as far as this invention is concerned. The mechanism portrayed by way of example on FIG. 8 is very similar to that already described with reference to FIG. 5 except that the pivotable shaft 21 and finger 23 are now replaced by a carriage 31 riding longitudinally on guide tracks 32. The remaining components are identical with components designated by the same numerals in FIG. 5.

To incorporate our invention in the conventional rangefinder-sight described, its mechanism should be so modified as to make it possible to move vertically the reticle 4 over a distance corresponding to a virtual displacement of the wedge 30 over an adjustable distance $\Delta q_3$ without actually altering the position of said wedge.

The relation between the virtual linear displacement $\Delta q_3$ and the resultant change $\Delta e_3$ of the ballistic curve can be readily found by differentiating Formula 8 and combining it with Formula 3. The result becomes:

$$\Delta e_3 = -a \cdot (N_3.R) \cdot \Delta q_3 \qquad (9a)$$

where $N_3$ is a constant determined by the design parameters of the instrument and is given by the formula $$N_3 = \frac{r}{f} \cdot \frac{1}{kB} \qquad (9b)$$

Some improvements known to prior art which make it possible for rangefinder-sights to cater for variations in the ballistic curve of the associated weapon provide an increment of the tangent elevation angle which obeys the law defined by Formula 9a. However in said instruments the identical end result is achieved by different means.

Again the manner in which the increment $\Delta q$ is obtained is immaterial as far as our invention is concerned. One of several conventional mechanisms which can serve this purpose was already described with reference to FIG. 7. This mechanism can also be applied to the rangefinder-sight now discussed.

When going over the three rangefinder-sights discussed in the present disclosure it is seen that the way in which the original ballistic curve of the instrument can be altered to approximate the ballistic curve of the weapon corresponding to changed firing conditions is given by the Formulae 5a, 7a, and 9a as it is seen that the angular tangent elevation increments $\Delta e_1$, $\Delta e_2 + \Delta e_3$, respectively, which may be obtained according to our invention is the product of three factors:

The first factor is the angle of arrival $a$ of the projectile at the target which is a function of range and is determined by the original ballistic curve.

The second factor is the term shown in brackets in the formulae quoted; this term includes a constant designated by the general term N and the range R, so that it is also a function of the range. The value of the constant N designated more particularly by the symbols $N_1$, $N_2$ and $N_3$ for the three instruments described, is given by the Formulae 5b, 7b and 9b and depends solely upon the design parameters of the instrument so that the bracketed term in Formulae 5a, 7a and 9a is a characteristic of the instrument itself and is not dependent on the latter's initial ballistic curve. It is also seen that our invention when applied to the instruments of FIGS. 3 and 5 provides an identical law of change of the increment $\Delta e_1$ or $\Delta e_2$ with range. This law is different in the instrument discussed with reference to FIGS. 8 and 9.

The third term in Formulae 5a, 7a and 9a, denoted by the symbol $\Delta q$ with a different suffix for each instrument, is the amount of displacement provided by the supplementary facilities proposed according to the present invention in order to modify the ballistic curve of the instrument. The magnitude of the displacement $\Delta q$ is adjustable at will and, as explained above, is so chosen as to nullify at some arbitrarily selected reference range $R_0$ the discrepancy between the modified ballistic curve of the instrument and the ballistic curve of the weapon for the new set of firing conditions whereby this discrepancy is greatly reduced at other ranges. The arbitrary reference range $R_0$ can be selected so as to minimize the residual discrepancy at other operational ranges.

In each of the improved instruments discussed the adjustment facility is fitted with a scale and pointer which indicate the magnitude of the adjustable increment $\Delta q$. This scale can be calibrated in terms of the resultant tangent elevation increment $\Delta e_1$ $\Delta e_2$ or $\Delta e_3$ of the ballistic curve of the instrument at reference range $R_0$ rather than in terms of $\Delta q_1$, $\Delta q_2$, or $\Delta q_3$. Or better still—it can be calibrated with reference to the new ballistic curve of the weapon which is approximated by applying the increment $\Delta e_1$, $\Delta e_2$ or $\Delta e_3$ or with reference to the factor which causes the ballistic curve to change. For instance, if the changes of the ballistic curve of the weapon result from variations in the muzzle velocity resulting from differences in the rate of burning of the propellant, and if the rate of burning of the propellant depends upon its temperature—then the scale can be calibrated directly in terms of propellant temperature.

Earlier inventions directed towards the solution of the same problem specify other modifications in the design of conventional rangefinder-sights; these modifications produce different laws of the rate of change of the resultant tangent elevation increment $\Delta e$ with range R than those formulated by the Equations 5a, 7a and 9a of this invention. It follows that the refinements according to our invention can be incorporated in conventional rangefinder-sights concurrently with other means of altering the ballistic curve of the instrument, so that their combined effect might alter the ballistic curve of the instrument in a manner providing a still closer fit with the ballistic curve of the weapon corresponding to the new set of firing conditions.

What I claim is:

1. In a rangefinder-sight adapted to be mounted athwart the barrel of a firing weapon and using two laterally spaced beams of light adapted to be viewed through a reticle, an optical deviator disposed in the path of one of said beams of light and adjustable for angularly adjusting the beam of light in the field of vision for ranging purposes, a lever operably connected between said optical deviator and said reticle, said optical deviator comprising a plane-parallel plate pivotally placed in one of the two beams of light, a pivot arm connected at one end to said plate, a cam rotatable about an axis and operably coupled to said pivot arm for pivotal movement of said plate, a second cam mounted to rotate about the axis of said first cam and operably connected to said reticle lever for vertical adjustment of said reticle in response to rotation of said first cam according to a predetermined ballistic curve of the firing weapon, and a gear mechanism operably connected to one of said cams to rotate it relative to the other cam for additional amounts calculated to compensate for any modified ballistic curve of the weapon, resulting from known changes in firing conditions.

2. In a rangefinder-sight adapted to be mounted athwart the barrel of a firing weapon and using two laterally spaced beams of light adapted to be viewed through a reticle, an optical deviator disposed in the path of one of said beams of light and adjustable for angularly adjusting the beam of light in the field of vision for ranging purposes, a lever operably connected between said optical deviator and said reticle, said optical deviator comprising a wedge, a slide mechanism supporting said wedge for sliding movement along the axis of one of said beams of light, a cam rotatable about an axis and operably coupled to said slide mechanism for movement of said wedge along the beam of light, a second cam mounted to rotate about the axis of said first cam and operably coupled to said reticle lever for vertical adjustment of said reticle in response to rotation of said first cam according to a predetermined ballistic curve of the firing weapon, and a gear mechanism operably connected to one of said cams to rotate it relative to the other cam for additional amounts calculated to compensate for any modified ballistic curve of the weapon, resulting from known changes in firing conditions.

References Cited in the file of this patent
UNITED STATES PATENTS

| | | |
|---|---|---|
| 1,291,848 | Griffith | Jan. 21, 1919 |
| 2,155,389 | Arden | Apr. 25, 1939 |
| 2,157,548 | Leitz | May 9, 1939 |
| 2,352,777 | Douden | July 4, 1944 |
| 2,426,812 | Bennett | Sept. 2, 1947 |
| 2,607,275 | Peterson | Aug. 19, 1952 |
| 2,719,454 | Nerwin | Oct. 4, 1955 |
| 2,887,774 | Toczylowski | May 26, 1959 |